R. A. BINGAMAN.
ADVERTISING DEVICE.
APPLICATION FILED JUNE 5, 1920.
1,422,529.
Patented July 11, 1922.
2 SHEETS—SHEET 1.
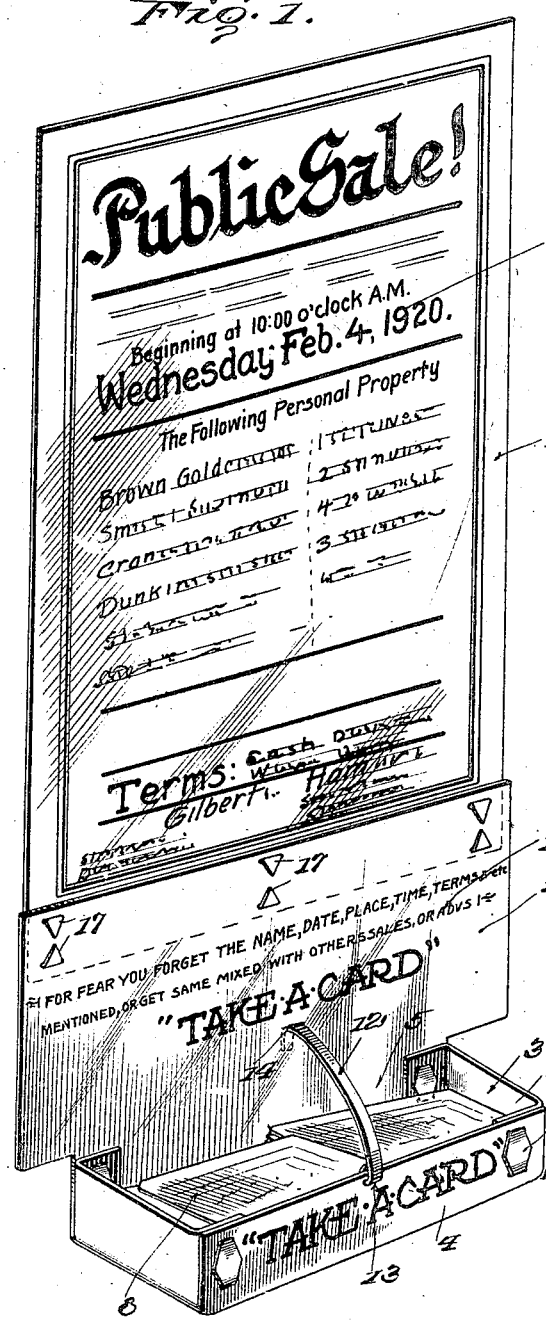
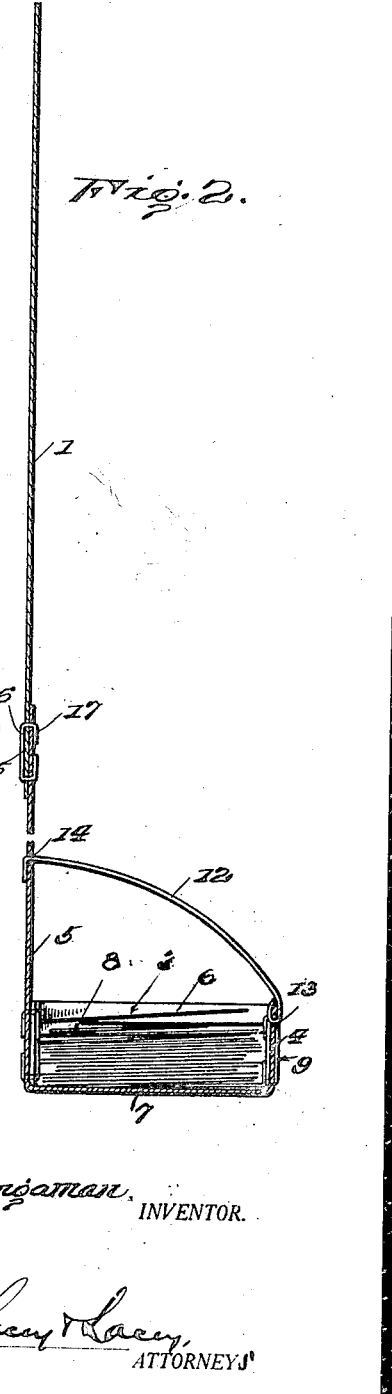
R. A. Bingaman, INVENTOR.
BY Lacy & Lacy, ATTORNEYS

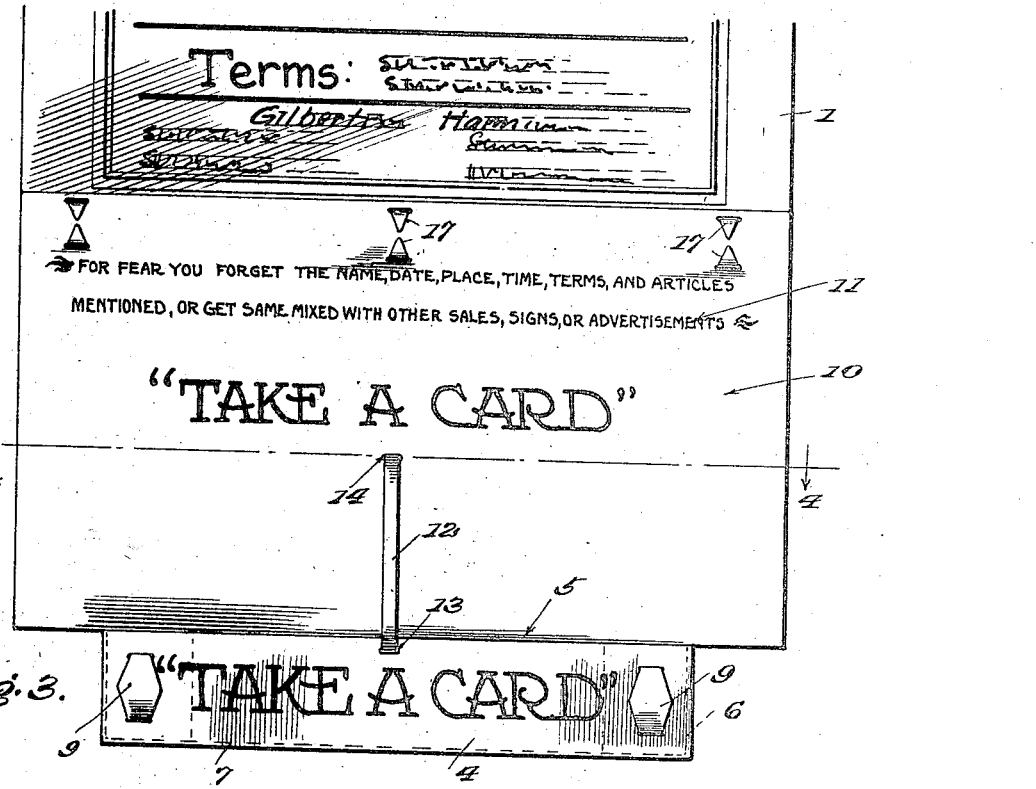

UNITED STATES PATENT OFFICE.

RAYMOND A. BINGAMAN, OF BATAVIA, OHIO.

ADVERTISING DEVICE.

1,422,529.  Specification of Letters Patent.  Patented July 11, 1922.

Application filed June 5, 1920. Serial No. 386,763.

*To all whom it may concern:*

Be it known that I, RAYMOND A. BINGAMAN, a citizen of the United States, residing at Batavia, in the county of Clermont and State of Ohio, have invented certain new and useful Improvements in Advertising Devices, of which the following is a specification.

This invention relates to advertising devices and has for its primary object to provide means for enhancing the value as an advertising medium of posters, sale signs, fair signs, show signs, or in fact any signs or fixed display advertisements.

The value of the ordinary poster, bill, or other fixed display advertisement as an advertising medium is somewhat limited for the reason that the casual observer will usually not remember the details recited thereby and will either completely forget the subject advertised or the stated time or date of sale, or will confuse the same with some other advertisement which he has seen. Of course, the primary purpose of posters, bills, and other large display advertisements of similar character is to attract attention and they undoubtedly serve this purpose, but unless the observer remembers the details recited thereby or acts immediately on the suggestion conveyed, he is only momentarily interested and the facts and suggestions soon pass from his mind. It is therefore an object of the present invention to provide means which may be applied to any such sign adapted to hold, contain, or support booklets, pamphlets, circulars, cards, samples, or in fact any type of advertising matter designed to carry forward the ideas presented by the advertisement proper so that if an observer is interested he may take from the device one of the books, pamphlets, cards, samples or the like which he may more conveniently examine at his leisure and thus become impressed with the ideas which the advertising matter is intended to convey.

In the accompanying drawings:

Figure 1 is a perspective view of one form of the device applied to a sale bill or poster;

Fig. 2 is a vertical front to rear sectional view through the device applied;

Fig. 3 is a detail front elevation of the device;

Fig. 4 is a horizontal sectional view on the line 4—4 of Fig. 3.

In the drawings the numeral 1 indicates an advertising medium which may be of any of the ordinary kinds now in general use such for example as a bill, poster, sign, etc., and upon which may be printed, painted, or in fact depicted in any of the customary ways, any desired advertising matter 2 having reference to the subject to be advertised and which may, of course, be an article of merchandise, goods to be auctioned or otherwise sold, real estate, machinery, and in fact anything which may form the subject matter of an advertisement.

In the embodiment of the invention illustrated in the drawings, the device comprises a container for the books, pamphlets, hand bills, samples, or the like to be distributed, and means whereby this container may be readily and yet securely attached to the advertising medium 1. The container is indicated in general by the numeral 3 and the same may be made of cardboard, sheet metal, celluloid, or in fact any material or combination of materials found suitable for the purpose. The container comprises a front wall 4, a rear wall 5, end walls 6, and a bottom 7 and is illustrated in the drawings as rectangular in form although it may be of any other desired shape or contour. The container is open at its top and the advertising mediums which it is designed to contain, and which are indicated in the drawings by the numeral 8, may be readily removed from the container through the said top thereof. If desired the container may be formed from a blank of sheet material which is initially in flat form and from this blank the several walls of the container may be folded up and secured by corner fastenings 9 or in any other suitable manner.

The rear wall 5 of the container is extended upwardly preferably a considerable distance above the open upper side of the container and considerably wider than the latter to provide an attaching member 10 upon which may be printed, painted, or otherwise impressed or marked as at 11 instructions to the observer of the sign or advertisement 1 to take one of the advertising mediums 8 from the container.

The attaching portion 10 is braced with relation to the body of the container preferably by means of a diagonal, arcuate bracing strip 12 having one end secured as at 13 to or through the front wall 4 of the container and its other end secured as at 14 to or through the said attaching portion 10, the intermediary portion being bent upwardly for facilitating the removal of the cards or pamphlets in the container.

In making use of the device, the upper part of the attaching portion 10 is disposed against, for example, the lower portion of the advertising sign or the like 1 and is removably secured thereto in any suitable manner as for example by staples 15 which may be formed of sheet metal and each of which includes a body 16 having pointed tongues 17 at its opposite ends which tongues may be inserted through the advertising medium 1 and the said portion 10 of the device of the invention and then turned down as shown most clearly in Figs. 1 and 2 of the drawings.

From the foregoing description of the invention it will be understood that the presence of the device in connection with any advertising medium such for example as the poster 1, will greatly enhance the value of the medium as the medium will serve in the first instance to attract the attention, and the convenient location of the device of the invention will influence the observer to take from the container one of the advertising mediums 8 which he will in all probability carry with him and thus have further brought to his attention the subject matter of the advertisement 1.

Having thus described the invention, what is claimed as new is:

1. A permanently open box for display material, a back portion integral with the box but of greater height and width than the box, a brace for said back portion securely fastened thereto and to the forward edge of the box, a poster detachably secured to the upper edge of said back portion and being of the same width as the latter.

2. A permanently open box for displaying material, a back portion integral with the box but of greater height and width than the box, a brace for said back portion securely fastened thereto and to the forward edge of the box, a poster detachably secured to the upper edge of said back portion and being of the same width as the latter, said back portion being provided with directions for disposing of the contents of the box.

In testimony whereof I affix my signature.

RAYMOND A. BINGAMAN. [L. S.]